United States Patent
Byrne et al.

(10) Patent No.: US 7,167,918 B2
(45) Date of Patent: Jan. 23, 2007

(54) MACRO-BASED ACCESS CONTROL

(75) Inventors: Robert Byrne, Voiron (FR); Pransanta Behara, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 995 days.

(21) Appl. No.: 10/045,682

(22) Filed: Oct. 29, 2001

(65) Prior Publication Data

US 2003/0110246 A1 Jun. 12, 2003

(51) Int. Cl.
*G06F 15/173* (2006.01)
(52) U.S. Cl. .................. 709/229; 709/203; 709/216; 709/219; 709/225; 707/8; 707/9; 707/10; 726/2; 726/27; 711/100
(58) Field of Classification Search .............. 709/216, 709/219, 225, 229, 203, 228; 726/2, 27; 707/8, 9, 10; 711/100
See application file for complete search history.

(56) References Cited

U.S. PATENT DOCUMENTS

| | | | | |
|---|---|---|---|---|
| 5,784,560 | A * | 7/1998 | Kingdon et al. | 709/201 |
| 5,812,776 | A * | 9/1998 | Gifford | 709/217 |
| 6,195,792 | B1 * | 2/2001 | Turnbull et al. | 717/110 |
| 6,490,619 | B1 * | 12/2002 | Byrne et al. | 709/223 |
| 6,505,238 | B1 * | 1/2003 | Tran | 709/208 |
| 6,535,879 | B1 * | 3/2003 | Behera | 707/9 |
| 6,539,379 | B1 * | 3/2003 | Vora et al. | 707/6 |
| 6,785,713 | B1 * | 8/2004 | Freeman et al. | 709/208 |
| 6,792,605 | B1 * | 9/2004 | Roberts et al. | 719/313 |
| 6,980,985 | B1 * | 12/2005 | Amer-Yahia et al. | 707/4 |
| 7,069,437 | B1 * | 6/2006 | Williams | 713/166 |
| 2003/0105978 | A1 | 6/2003 | Byrne | |

OTHER PUBLICATIONS

Butler W. Lampson, "Designing a Global Name Service," Digital Equipment Corporation, 1986 Conference on Principles of Distributed Computing, 1985, (19 Pages).
Michael Donnelly, "Designing and LDAP Directory Tree," http://ldapman.org/articles/tree_design.html, May 9, 2000, (6 Pages).
"Introduction to LDAP—Introduction to LDAP," http://www.cica.es/comu/php3Doc/ref.ldap, Apr. 20, 2001, (4 Pages).
Damiani et al., "Fine Grained Access Control for SOAP E-Services," WWW10, May 1-5, 2001, (pp. 504-513).
Hays et al., "The Object Filter and Access Control Framework," PLoP 2000 Conference, 2000, (15 Pages).
Netscape Directory Server Administrator's Guide Version 4.0, 1998, Netscape Communications Corporation, Chapters 5 & 8.

* cited by examiner

*Primary Examiner*—Saleh Najjar
*Assistant Examiner*—Michael Y. Won
(74) *Attorney, Agent, or Firm*—Robert C. Kowert; Meyertons, Hood, Kivlin, Kowert & Goetzel, P.c.

(57) ABSTRACT

Various embodiments of systems and methods for using condition defining data (e.g., access control instructions) attached to nodes in a tree to implement node-related conditions in a directory server having a tree structure are disclosed. In one embodiment, a method includes attaching condition defining data that includes a variable portion and a reference portion to a given node in the tree structure, and upon access to a subnode of said given node in the tree, using the reference portion and a property of the subnode to tentatively derive a value for the variable portion, changing the variable portion into the value, and evaluating the condition in said condition defining data.

45 Claims, 10 Drawing Sheets

| Attribute Type 120 | Attribute Values 122 |
|---|---|
| cn: | Barbara Jensen<br>Babs Jensen |
| sn: | Jensen |
| telephonenumber: | +1 408 555 1212 |
| mail: | babs@airius.com |

Entry 124

| Macro | ACI Keyword "in" | ACI Keyword "out" |
|---|---|---|
| ($dn) | target | targetfilter, userdn, roledn, groupdn, userattr |
| [$dn] | - | targetfilter, userdn, roledn, groupdn, userattr |
| ($attr.*attrName*) | - | targetfilter, userdn, roledn, groupdn, userattr |

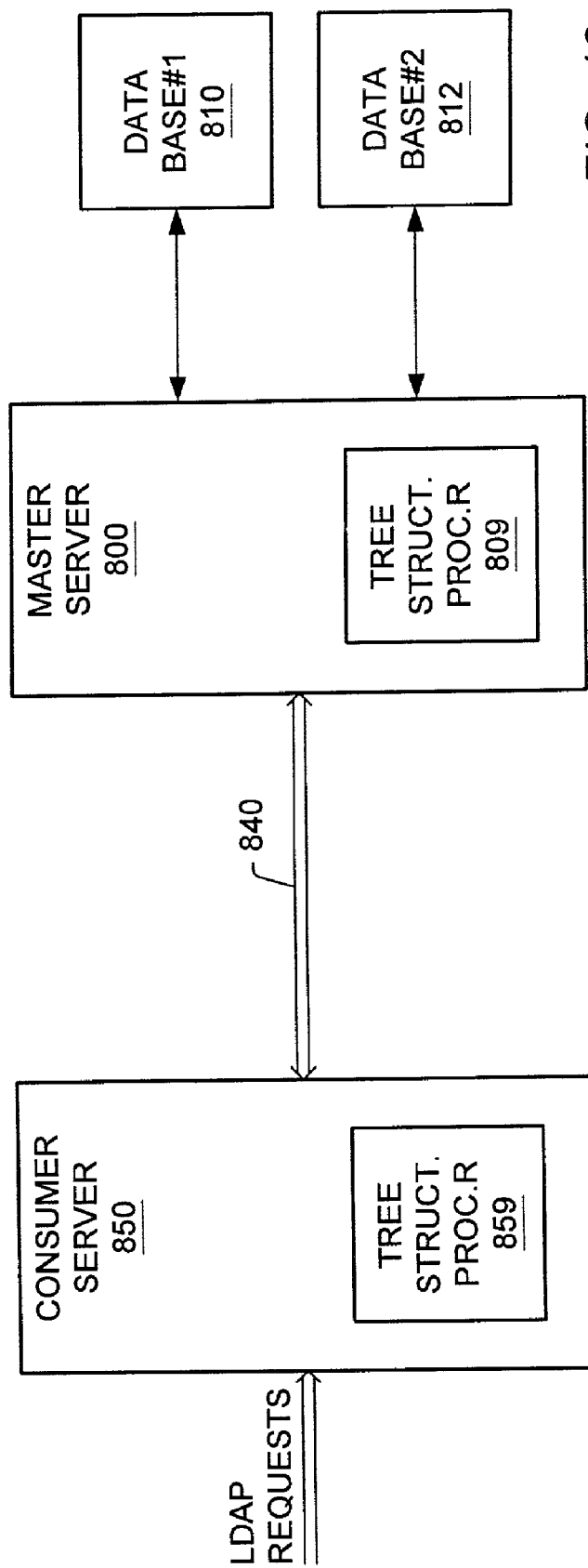

MACRO-BASED ACCESS CONTROL

BACKGROUND OF THE INVENTION

1. Field of the Invention

This invention relates to distributed computer systems and, more particularly, to condition defining data such as that used to control access to entries in a directory.

2. Description of the Related Art

In certain fields of technology, computer systems such as web networks include equipment and software of diverse types and having different manufacturers. This is true at both the hardware and the software level.

It is desirable that network users ("client components") can access, upon query, to a large amount of data ("application software components") making it possible for the network users to create their own dynamic web site or to consult a dynamic web site such as an e-commerce site on an multi-platform computer system (e.g., Solaris, Windows NT, AIX, HPUX). These queries are directed to a directory (e.g., an LDAP (Lightweight Data Access Protocol directory) and managed by a directory server. It is further desirable that this access be made possible rapidly for each query arriving after a first query.

Directories often have access control mechanisms to restrict access to certain portions of the directory. For example, some access control mechanisms may be designed so that regular users only have access to the information they need to know while other users (e.g., administrators) have access to larger segments (or all) of the directory. However, the access control mechanisms may have to be duplicated a large number of times (e.g., for each node in the directory), within a given directory structure. This may induce a supplementary load in many respects, including storage capability and the usual compromise in memory between data storage and program execution, in connection with the time needed for execution.

SUMMARY

Various embodiments of systems and methods for using condition defining data (e.g., ACIs (Access Control Instructions)) attached to nodes in a tree to implement node-related conditions in a directory server having a tree structure are disclosed. In one embodiment, a method includes attaching condition defining data that includes a variable portion and a reference portion to a given node in the tree structure, and upon access to a subnode of said given node in the tree, using the reference portion and a property of the subnode to tentatively derive a value for the variable portion, changing the variable portion into the value, and evaluating the condition in said condition defining data.

In another embodiment, a directory server system may include a tree structure that includes a plurality of nodes and a tree structure processor configured to use condition defining data (e.g., ACIs) attached to nodes. The condition defining data may include a variable portion and a reference portion. The tree structure processor may be configured tentatively derive a value for the variable portion using the reference portion and a property of the subnode upon access to a subnode of the given node in the tree. The tree structure may then use the condition in said condition defining data with its variable portion changed into the derived value.

In one embodiment, a computer readable medium may include program instructions computer executable to attach condition defining data that includes a variable portion and a reference portion to a given node in the tree structure, and upon access to a subnode of said given node in the tree, use the reference portion and a property of the subnode to tentatively derive a value for the variable portion, change the variable portion into the value, and evaluate the condition in said condition defining data.

BRIEF DESCRIPTION OF THE DRAWINGS

A better understanding of the present invention can be obtained when the following detailed description is considered in conjunction with the following drawings, in which:

FIG. 13 shows a system that may employ an embodiment of macro-based access control.

Figure 1:
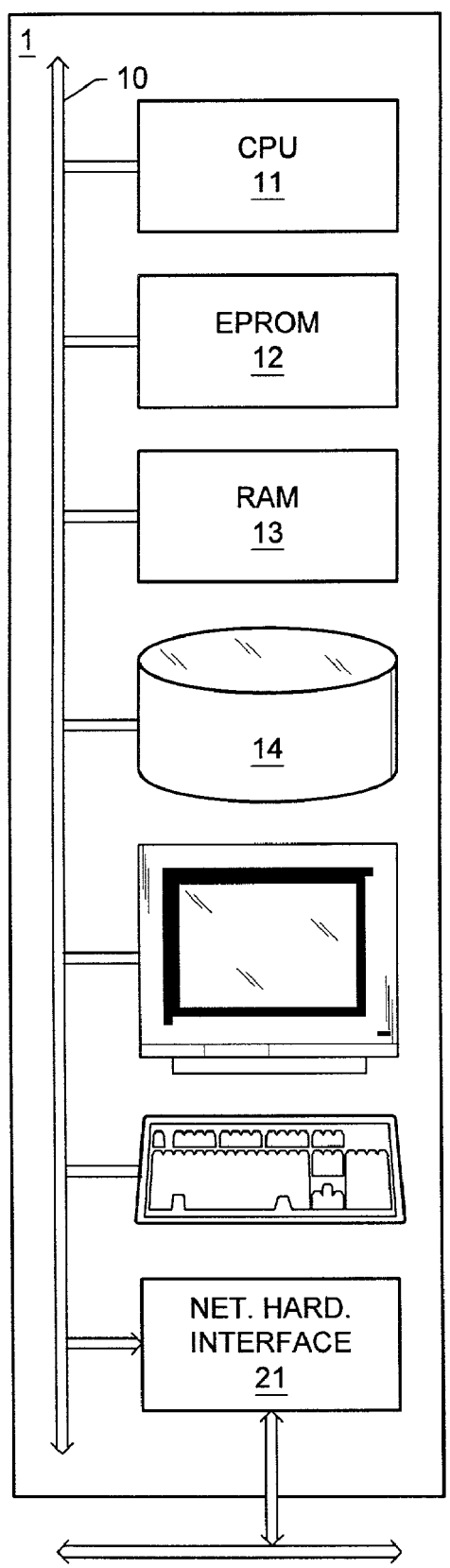
FIG. 1 is a block diagram of a computer system in which an embodiment of a macro-based access control system may be implemented.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

This invention may be implemented in a computer system, or in a network comprising computer systems. One example of the hardware used in such a computer system is shown in FIG. 1. In FIG. 1, computer system 1 includes processor 11, non-volatile memory 12, memory 13, mass memory 14, display 15, user input device 16, network interface device 21, communication medium 20, and bus system 10.

Processor 11 may include one or more Ultra-Sparc processors or other suitable processors, as desired. Non-volatile memory 12 may include an EPROM (as shown), Flash memory, or other suitable type of memory on which to store BIOS (Basic Input Output System) instructions. Memory 13 may include a suitable type of RAM (Random Access Memory) such as DRAM, SDRAM, DDR DRAM, RDRAM, etc. Mass memory 14 may include one or more hard disk drives or other mass storage media (e.g., optical or magneto-optical drives). Display 15 may include a suitable monitor. User input device 16 may include one or more devices such as a keyboard, mouse, joystick, etc.

Instructions implementing an embodiment of macro-based access control, as described below, may be executed by processor 11 and stored in memory 13. Embodiments of software instructions may include, separately or together, the instructions used when writing the condition-defining data and/or macros (or equivalent), as well as precursors and/or generators of such instructions, and the resulting instructions, as applicable (e.g., in a directory server). In some embodiments, the instructions may be combined with language dependent and/or hardware dependent instructions and/or data. In some embodiments, the instructions may be stored on another computer readable medium (e.g., a CD, DVD, hard disk, optical disk, tape device, floppy disk, etc.). In order to execute the instructions, the instructions may be loaded into memory 13. In addition, the computer readable medium may be located in either a first computer, in which the software program is stored or executed, or in a second different computer, which connects to the first computer over a network such as the Internet. In the latter instance, the second computer may provide the program instructions to the first computer for execution. The instructions and/or data may also be transferred upon a carrier medium. In some embodiments, a computer readable medium may include a carrier medium such as networks and/or a wireless link upon which signals such as electrical, electromagnetic, or digital signals may be conveyed.

Network interface 21 may be connected to communication medium 20. In some embodiments, network interface device 21 may be an Ethernet device, a serial line device, and/or an ATM device. Communication medium 20 may be in communication with other computers (not shown). Medium 20 may include wire cables, fiber optics, and/or radio-communications, etc.

The components shown in FIG. 1 may exchange data through one or more bus systems 10, schematically shown as a single bus for ease of description. Bus system 10 may include a processor bus (e.g., a PCI (Peripheral Component Interconnect) bus) connected via appropriate bus bridges to one or more peripheral buses (e.g., an ISA (Industry Standard Architecture) bus and/or an SCSI (Small Computer System Interface) bus).

Multi-Platform System

Figure 2:
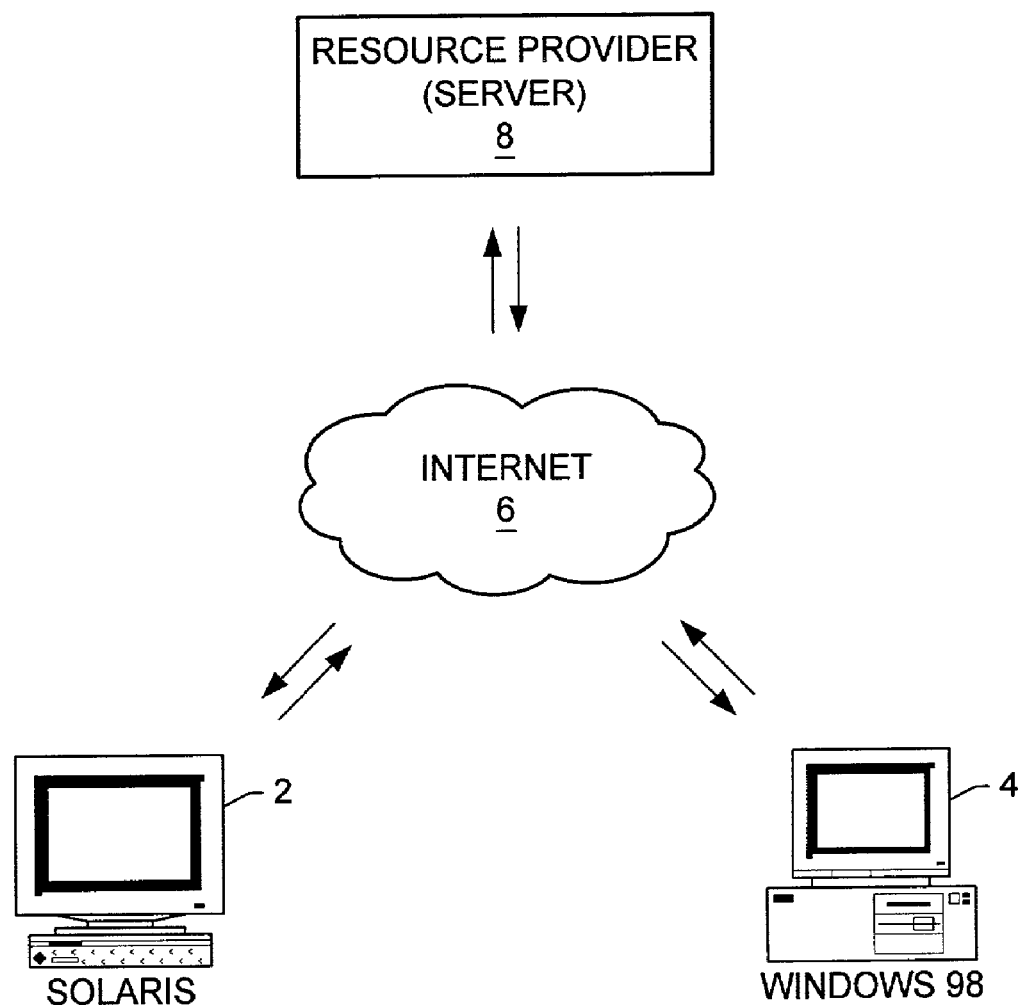
FIG. 2 illustrates a block diagram of one embodiment of a multiple platform environment.

FIG. 2 illustrates a conceptual arrangement in which a first computer 2 running the Solaris platform and a second computer 4 running the Windows 98™ platform are connected to a server 8 via the Internet 6. A resource provider using the server 8 may be any type of business, government, or educational institution. The resource provider 8 may need to be able to provide its resources to both the user of the Solaris platform and the user of the Windows 98™ platform, but may not have the luxury of being able to custom design its content for the individual platforms. Thus, effective programming at the application level may require the platform concept to be extended all the way up the stack, including all the new elements introduced by the Internet. Such an extension may allow application programmers to design for a stable, consistent environment.

Internet Service Deployment Platform

Figure 3:
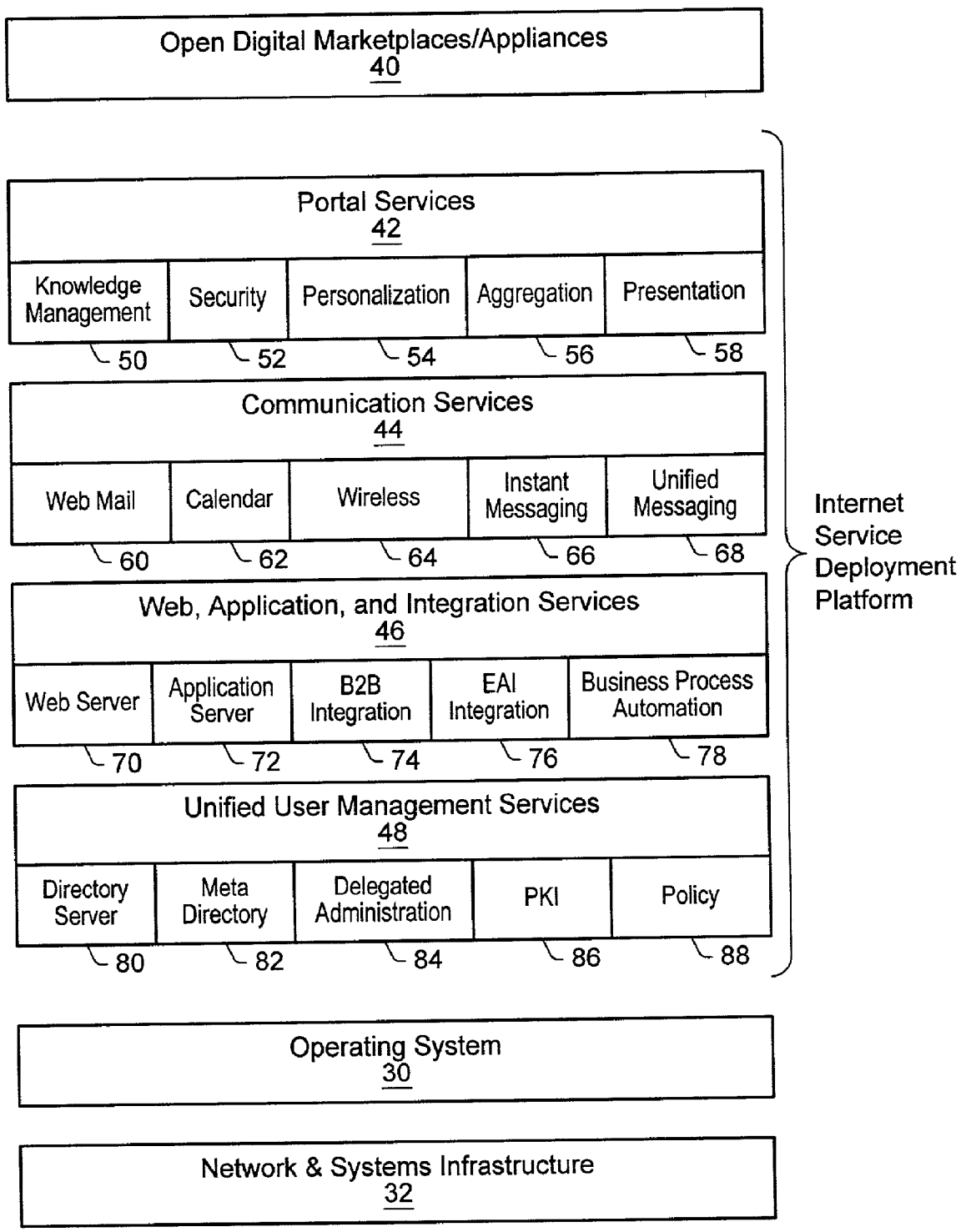
FIG. 3 illustrates a block diagram of an embodiment of an Internet Service Development Platform.

FIG. 3 shows one embodiment of an ISDP (Internet Service Deployment Platform) 28. In one embodiment, ISDP 28 may be an ISDP developed by iPlanet E-commerce Solutions, a Sun Microsystems|Netscape Alliance. ISDP 28 may be a "net-enabling" platform that provides business with a very broad, evolving, and standards-based foundation upon which to enable network service. ISDP 28 may incorporate the elements of the Internet portion of the stack and join the elements with traditional platforms at the lower levels. ISDP 28 may sit on top of traditional operating systems 30 and infrastructures 32. This arrangement may allow enterprises and service providers to deploy next generation platforms while preserving "legacy-system" investments, such as a mainframe computer or any other computer equipment that is selected to remain in use after new systems are installed.

ISDP 28 may include multiple integrated layers of software that provide services supporting application development, e.g., business-to-business exchanges, communications and entertainment vehicles, and retail Web sites. In addition, ISDP 28 may employ open standards at each level of integration, enabling customers to mix and match components. ISDP 28 components may be designed to be integrated and optimized to reflect a specific business need. However, there is no requirement that all solutions within the ISDP 28 be employed, or any one or more be exclusively employed.

As shown in FIG. 3, ISDP 28 may include several layers. Graphically, the uppermost layer of ISDP 28 starts below the Open Digital Marketplace/Application strata 40. The uppermost layer of ISDP 28 may be a Portal Services Layer 42 that may provide a basic user point of contact and may be supported by integration solution modules such as knowledge management 50, personalization 52, presentation 54, security 56, and/or aggregation 58.

Next, a layer of specialized Communication Services (44) may handle functions such as unified messaging 68, instant messaging 66, web mail 60, calendar scheduling 62, and/or wireless access interfacing 64.

A layer called Web, Application, and Integration Services 46 may follow. This layer may have different server types to handle the mechanics of user interactions and may include application and Web servers. For example, iPlanet™ offers the iPlanet™ Application Server 72, Web Server 70, Process Manager 78, Enterprise Application and Integration (EAI) 76, and Integrated Development Environment (IDE) tools 74.

Below the server strata, an additional layer called Unified User Management Services 48 may be included to handle issues surrounding management of user populations, including Directory Server 80, Meta-directory 82, delegated administration 84, Public Key Infrastructure (PKI) 86, and/or other administrative/access policies 88. The Unified User Management Services layer 48 may provide a single solution to centrally manage user account information in extranet and e-commerce applications. In one embodiment, the core of this layer may be the iPlanet™ Directory Server 80 or another Lightweight Directory Access Protocol (LDAP)-based directory server.

A LDAP-based directory server such as the iPlanet Directory Server (iDS) may provide a centralized directory service for an intranet or extranet while integrating with existing systems. The term directory service refers to a collection of software, hardware, and processes that store information and make the information available to users. The directory service generally includes at least one instance of the directory server and one or more directory client programs. Client programs can access names, phone numbers, addresses, and/or other data stored in the directory.

One common directory service is a Domain Name System (DNS) server. A DNS server maps computer host names to IP addresses. Thus, all of the computing resources (hosts) become clients of the DNS server. The mapping of host names may allow users of the computing resources to easily locate computers on a network by remembering host names rather than numerical Internet Protocol (IP) addresses. Note that while some directory services such as a DNS server may only store a few types of information, a typical directory service may store virtually unlimited types of information.

A directory server such as iDS may be a general-purpose directory that stores information in a network-accessible repository. Such a directory server may provide a standard protocol and application programming interface (API) to access the information contained by the directory server.

The directory server may provide global directory services, meaning that information may be provided to a wide variety of applications. Until recently, many applications came bundled with a proprietary database. While a proprietary database may be convenient if only one application is used, multiple databases may become an administrative burden if the databases manage the same information. For example, in a network that supports three different proprietary e-mail systems where each system has a proprietary directory service, if a user changes passwords in one directory, the changes may not automatically be replicated in the other directories. Accordingly, managing multiple instances of the same information may result in increased hardware and personnel costs.

A global directory service may provide a single, centralized repository of directory information that any application can access. However, giving a wide variety of applications access to a directory may create a need for a network-based means of communicating between the numerous applications and the single directory. A directory lookup tool such as LDAP may be used to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information. X.500 and X.400 are the corresponding Open Systems Interconnect (OSI) standards. LDAP currently supports X.500 Directory Access Protocol (DAP) capabilities and may easily be embedded in lightweight applications (both client and server) such as email, web browsers, and groupware.

An LDAP-compliant directory, such as the iDS, may provide a master directory that owns all user, group, and access control information. In some embodiments, the directory may be hierarchical (as opposed to relational) and may be optimized for reading, reliability, and scalability. This directory may become a specialized central repository that contains information about objects and provides user, group, and/or access control information to all applications on a network. For example, the directory may be used to provide information technology managers with a list of all the hardware and software assets in a widely spanning enterprise. A directory server may also provide resources that all applications can use and aid in the integration of applications that have previously functioned as stand-alone systems. For example, instead of creating an account for each user in each system the user needs to access, a single directory entry may be created for the user in the LDAP directory.

Figure 4:
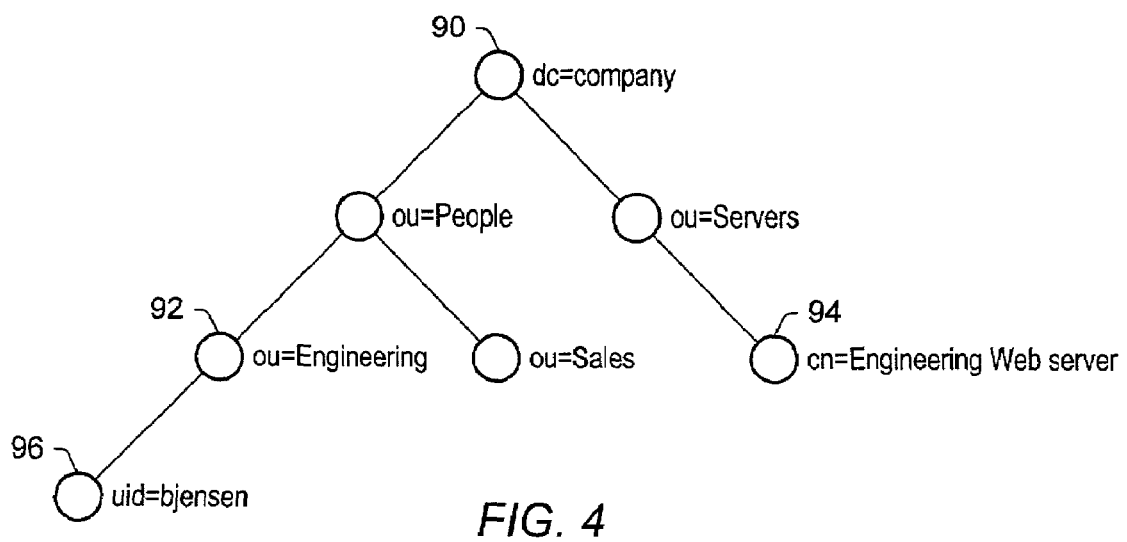
FIG. 4 illustrates part of one embodiment of a directory.

FIG. 4 shows a portion of a typical directory with different entries corresponding to real-world objects. The directory depicts an organization entry 90 with the attribute type of domain component (dc), an organizational unit entry 92 with the attribute type of organizational unit (ou), a server application entry 94 with the attribute type of common name (cn), and a person entry 96 with the attribute type of user ID (uid). All entries may be connected by the directory.

In one embodiment, the directory protocol (e.g., a LDAP protocol) may be a message-oriented protocol. For example, a client may construct an LDAP message containing a request and send the message to the server. The server may process the request and send one or more results back to the client as a series of one or more LDAP messages.

Figure 5:
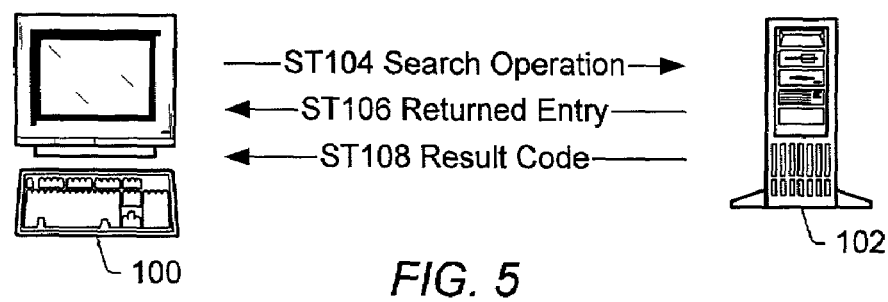
FIG. 5 illustrates the LDAP protocol used for a simple request in one embodiment of a network system.

FIG. 5 shows an example of how an LDAP client 100 may search the directory for a specific entry. The client 100 may construct an LDAP search request message and send the message to the LDAP server 102, (operation ST104). The LDAP server 102 may retrieve the requested entry from the database and send the entry to the client 100 in an LDAP message (operation ST106). A result code may also be returned to the client 100 (e.g., in a separate LDAP message), (operation ST108).

LDAP-compliant directory servers (e.g., iDS) may have nine basic protocol operations. The basic protocol operations may be divided into three categories. The first category is interrogation operations, which include search and compare operators. These interrogation operations allow questions to be asked of the directory. The search operation is used to search the directory for entries and retrieve individual directory entries. In some embodiments, a separate LDAP read operation may not be implemented. The second category of interrogation operations is update operations, which include add, delete, modify, and modify distinguished name (DN) (i.e., rename) operators. A DN is a unique, unambiguous name of an entry in LDAP. Update operations allow information in the directory to be updated.

The third category of protocol operations is authentication and control operations, which include bind, unbind, and abandon operators. The bind operator allows a client to identify itself to the directory by providing an identity and authentication credentials. For example, the client may provide a DN and a set of credentials t to the directory. The server may check whether the credentials are correct for the given DN and, if the credentials are correct, note that the client is authenticated as long as the client's connection remains open or until the client re-authenticates. The unbind operation allows a client to terminate a session. When the client issues an unbind operation, the server may discard any authentication information associated with the client connection, terminate any outstanding LDAP operations, and disconnect from the client, thus closing the TCP connection. The abandon operation allows a client to indicate that the result of an operation (e.g., identified by a message ID in which the request for that operation was submitted) previously submitted is no longer of interest. Upon receiving an abandon request, the server may terminate processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

Figures 6, 7:
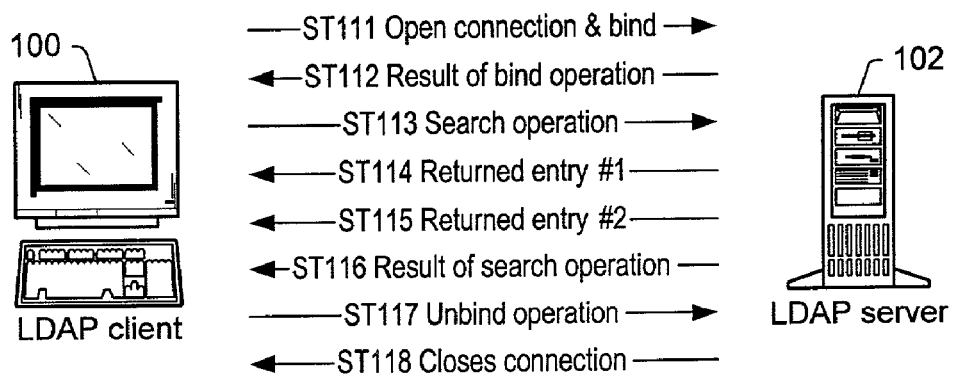
FIG. 6 illustrates an LDAP exchange between the IDAP client and LDAP server according to one embodiment.
FIG. 7 illustrates one embodiment of a directory entry showing attribute types and values.

A typical LDAP client/server exchange may proceed as depicted in FIG. 6. First, the LDAP client 100 opens a TCP connection to the LDAP server 102 and submits the bind operation (operation ST111). This bind operation may include the name of the directory entry that the client wants to authenticate as, along with the credentials to be used when authenticating. Credentials are often simple passwords, but they may also be digital certificates used to authenticate the client 100. After the directory has verified the bind credentials, the directory may return a success result to the client 100 (operation ST 112). Then, the client 100 may issue a search request (operation ST 113). The LDAP server 102 processes this request, which results in two matching entries (operation STs 114 and 115). Next, the LDAP server 102 may send a result message (operation ST 116). The client 100 may then issue the unbind request (operation ST 117), which indicates to the LDAP server 102 that the client 100 wants to disconnect. The LDAP server 102 may oblige by closing the connection (operation ST 118).

Directory-enabled clients may perform useful, complex tasks by combining the basic LDAP operations. For example, an electronic mail client may look up mail recipients in a directory in order to help a user address an e-mail message.

The basic unit of information in the LDAP directory is an entry. An entry is a collection of information about an object. Entries may include a set of attributes, each of which describes one particular trait of an object. Attributes may include an attribute type (e.g., common name (cn), surname (sn), etc.) and one or more values. FIG. 7 shows an exemplary entry 124 showing attribute types 120 and values 122. Attributes may have constraints that limit the type and length of data placed in attribute values 122. A directory scheme may place restrictions on the attribute types 120 that must be, or are allowed to be, contained in the entry 124.

Access Control

An LDAP directory may be provided with access control mechanisms so that regular users only have access to the information they need to know, while other users such as administrators may access large segments of (or all of) the tree.

In some embodiments (e.g., those employing iDS as the directory server), the access control mechanism may be called "Access Control Instructions" (ACIs). An exemplary implementation of a set of ACIs is described below, by way of example only, and for helping to understand this specification.

It has been observed that the access control mechanisms may have to be duplicated a large number of times within a given directory server tree structure. This induces a supplementary load in many respects, including storage capability and the usual compromise in memory between data storage and program execution, in connection with the time needed for execution.

Figures 8, 9:
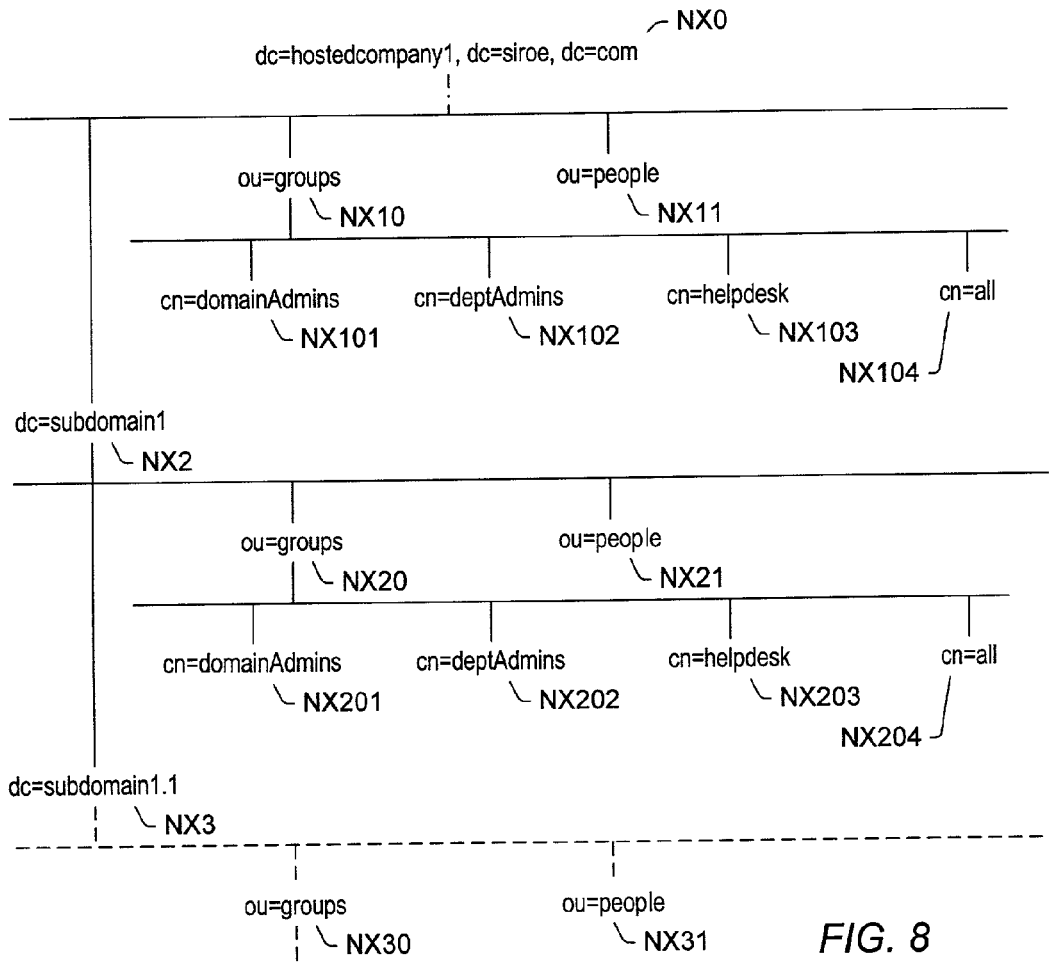
FIG. 8 shows an exemplary portion of one embodiment of a LDAP tree.
FIG. 9 is a table showing syntax alternatives for a macro according to one embodiment.

FIG. 8 shows an exemplary directory tree named Siroe. The exemplary tree of FIG. 8 has a repeating pattern of subdomains with the same tree structure (e.g., as illustrated in E.1.1). The pattern of nodes NX0, NX10, NX11 and NX101 through NX104 for hostedcompany1 may repeat for other companies, e.g., hostedcompany2, etc., as visible from the suffixes shown in E.1.2. The pattern may also repeat at different levels in the tree, e.g. for hostedcompany1, it repeats from node NX2 of subdomain subdomain1, with nodes NX20, NX21 and NX201 through NX204 and from node NX3, for subdomain subdomain1.1 of subdomain subdomain1, with nodes NX30, NX31 and NX301 through NX304.

E.1.1. (ou=groups, ou=people)
E.1.2. dc=hostedCompany2, dc=siroe, dc=com dc=hostedCompany3, dc=siroe, dc=com.

The ACIs that apply in the directory tree may also have a repeating pattern. For example, the ACI shown in E.1.3 may be located on the node NX0 of FIG. 8, which is defined by E.1.4. This ACI grants read and search rights to the DomainAdmins group to any managed entry in the subtree starting from node NX0.

E.1.3. aci: (targetattr="*") (targetfilter= (objectClass=nsManagedDomain)) (version 3.0; acl "Domain access"; allow (read,search) groupdn="ldap:///cn=DomainAdmins, ou=Groups, dc=hostedCompany1, dc=siroe, dc=com";)

E.1.4. dc=hostedCompany1 , dc=siroe, dc=com

Four ACIs are shown in E.2.1 through E.2.4. In each case the node on which the ACI is attached is shown first, after the label "NX"; then, the ACI expression is given. In these four ACIs, the only differentiator is the DN specified in the groupdn keyword.

E.2.1. NX: dc=hostedCompany1, dc=siroe, dc=com aci: (targetattr="*")(targetfilter= (objectClass=nsManagedDomain)) (version 3.0; acl "Domain access"; allow (read,search) groupdn="ldap:///cn=DomainAdmins, ou=Groups, dc=hostedComp any1, dc=siroe, dc=com";)

E.2.2. NX: dc=subdomain1, dc=hostedCompany1, dc=siroe, dc=com aci: (targetattr="*")(targetfilter= (objectClass=nsManagedDomain)) (version 3.0; acl "Domain access"; allow (read,search) groupdn="ldap:///cn=DomainAdmins, ou=Groups, dc=subdomain1, dc=hostedCompany1, dc=siroe, dc=com";)

E.2.3. NX: dc=hostedCompany2, dc=siroe, dc=com aci: (targetattr="*")(targetfilter= (objectClass=nsManagedDomain)) (version 3.0; acl "Domain access"; allow (read,search) groupdn="ldap:///cn=DomainAdmins, ou=Groups, dc=hostedComp any2, dc=siroe, dc=com";)

E.2.4 NX: dc=subdomain1, dc=hostedCompany2, dc=siroe, dc=com aci: (targetattr="*")(targetfilter= (objectClass=nsManagedDomain)) (version 3.0; acl "Domain access"; allow (read,search) groupdn="ldap:///cn=DomainAdmins, ou=Groups, dc=subdomain1, dc=hostedCompany2, dc=siroe, dc=com";)

These four ACIs are clearly repetitive. Typically, they would have to be repeated as many times as there are repeating patterns down and across the whole directory tree, keeping in mind that an actual directory tree may have many times the tree structure shown in FIG. 8.

Macro-based Access Control

In one embodiment, an ACI, together with a macro, may be attached to the leading node of the repetitive tree structure, which may be the root node (e.g., dc=siroe, dc=com in the example). By using a macro for the DN, repetitive ACIs may be replaced by an ACI closer to the root of the tree.

To simplify the discussion in this part of the specification, the ACI keywords used to provide bind credentials such as userdn, roledn, groupdn, and userattr, are collectively called the subject (as opposed to the target) of the ACI. Macro ACIs may be used in the subject part or in the target part of an ACI.

For example, an ACI may be as shown in E.3. A macro attached to an ACI may include the following types of expressions to replace a DN or part of a DN: ($dn), which matches a substring of the DN of the targeted resource ("exact" match); [$dn], which may be used in connection with a ($dn) to represent the matched substring (and substrings thereof, i.e., "near" match ) in the subject of the ACI; ($attr.attrName), which is used to represent any of the values of the attribute <at trName>, as they exist in the targeted resource in the subject of the ACI.

E.3 aci: (target="ldap:///ou=Groups, ($dn), dc=siroe, dc=com") (targetattr="*")(targetfilter= (objectClass=nsManagedDomain)) (version 3.0; acl "Domain access"; allow (read,search) groupdn="ldap:///cn=DomainAdmins, ou=Groups, [$dn], dc=siroe, dc=com";)

The table of FIG. 9 shows in what parts of the ACI the DN macros may be used in one embodiment. Combining the ($dn) macro and the ($attr. at trName) macro may be allowed in some embodiments.

The macro matching for ($dn) will now be described. Generally, the ($dn) macro is replaced by the matching part of the resource targeted in an LDAP request.

Consider for example an LDAP request targeted at the entry shown in E.4.1, and an ACI that defines the target as shown in E.4.2. In this case, the ($dn) macro matches with the string expression shown in E.4.3.

E.4.1. cn=all, ou=groups, dc=subdomain1, dc=hostedCompany1, dc=siroe, dc=com

E.4.2. (target="ldap:///ou=Groups, ($dn), dc=siroe, dc=com")

E.4.3. "dc=subdomain1, dc=hostedCompany1"

When the subject of the ACI also uses ($dn), the substring that matches the target is used to expand the subject.

Figure 10:
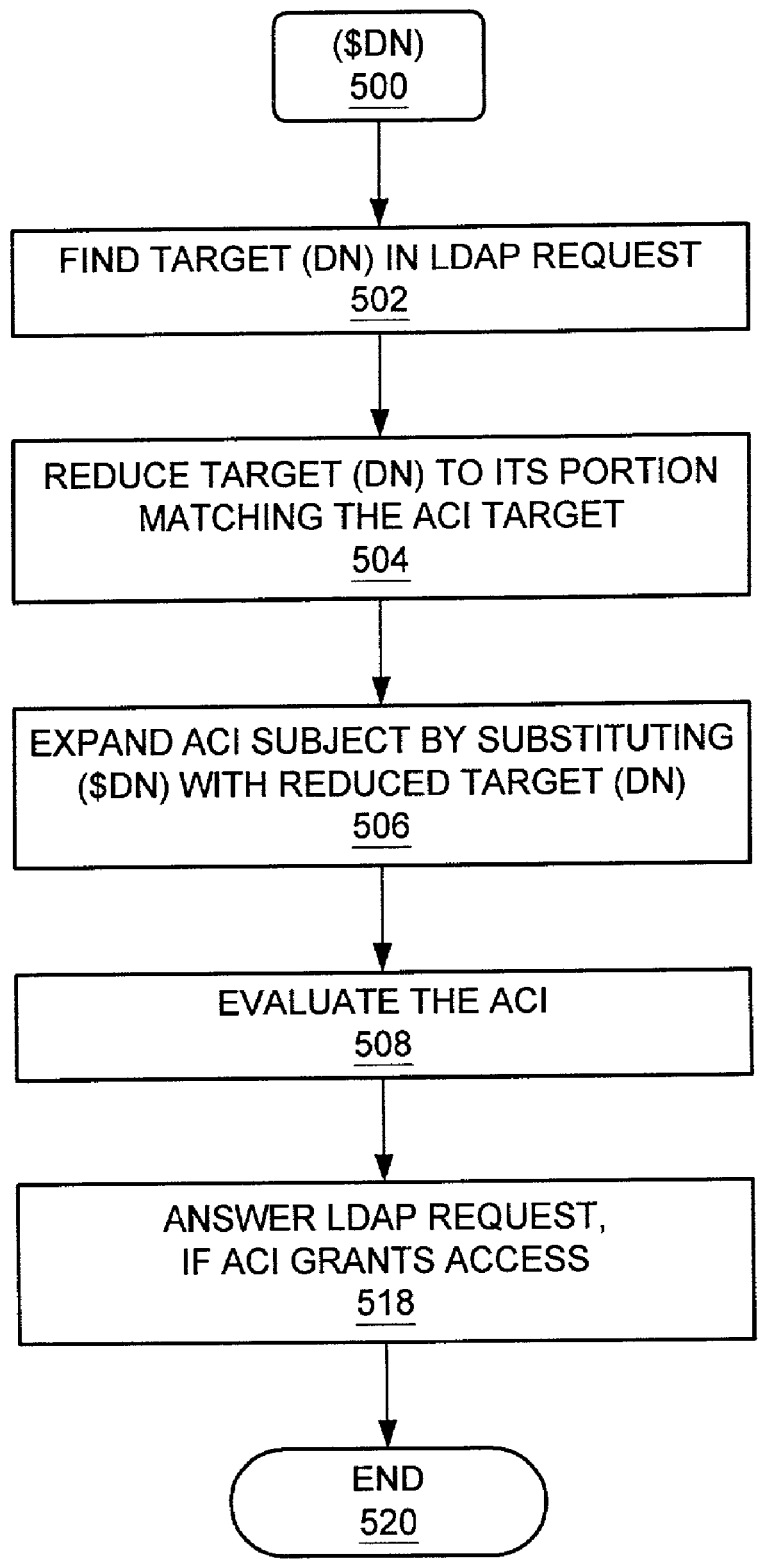
FIG. 10 is a flow-chart for a first form of macro in accordance with one embodiment.

Reference is now made to FIG. 10, and to the example E.5, which involves macro ACI E.5.1. Operation 502 determines the target DN in the current LDAP request, (e.g., E.4.1). Operation 504 determines whether the target DN of E.4.1 matches the target in the ACI (e.g., E.5.1). If so, the target expression is reduced to its portion matching the ACI. At 506, the ACI is expanded by substituting ($dn) with that reduced portion (i.e., E.5.2) in the example.

E.5.1. aci: (target="ldap:///ou=*, ($dn), dc=siroe, dc=com") (version 3.0; acl "Domain access"; allow (read,search) groupdn="ldap:///cn=DomainAdmins, ou=Groups, ($dn), dc=siroe, dc=com";)

E.5.2. dc=subdomain1, dc=hostedCompany1

E.5.3. aci: (target="ldap:///ou=Groups, dc=subdomain1, dc=hostedCompany1, dc=siroe, dc=com") (version 3.0; acl "Domain access"; allow (read,search) groupdn="ldap:///cn=DomainAdmnins, ou=Groups, dc=subdomain1, dc=hostedCompany1, dc=siroe, dc=com";)

In the example, the "($dn)" is also present in the subject portion of the ACI. If so, again assuming that the string matching ($dn) in the target is E.5.2, then the same string is used in the subject. Then, at 506, the ACI of E.5.1. is expanded as shown in E.5.3. Once the macro has been expanded, the Directory Server evaluates the ACI following the normal process to determine whether access is granted or not, at 508. The LDAP request is answered at 518, if it is granted access (i.e., unless access is denied by the ACI).

The macro matching for [$dn] will now be described. In fact, the matching mechanism for [$dn] is slightly different than for ($dn). The DN of the targeted resource is examined several times, each time dropping the left-most RDN component, until a match is found.

Figure 11:
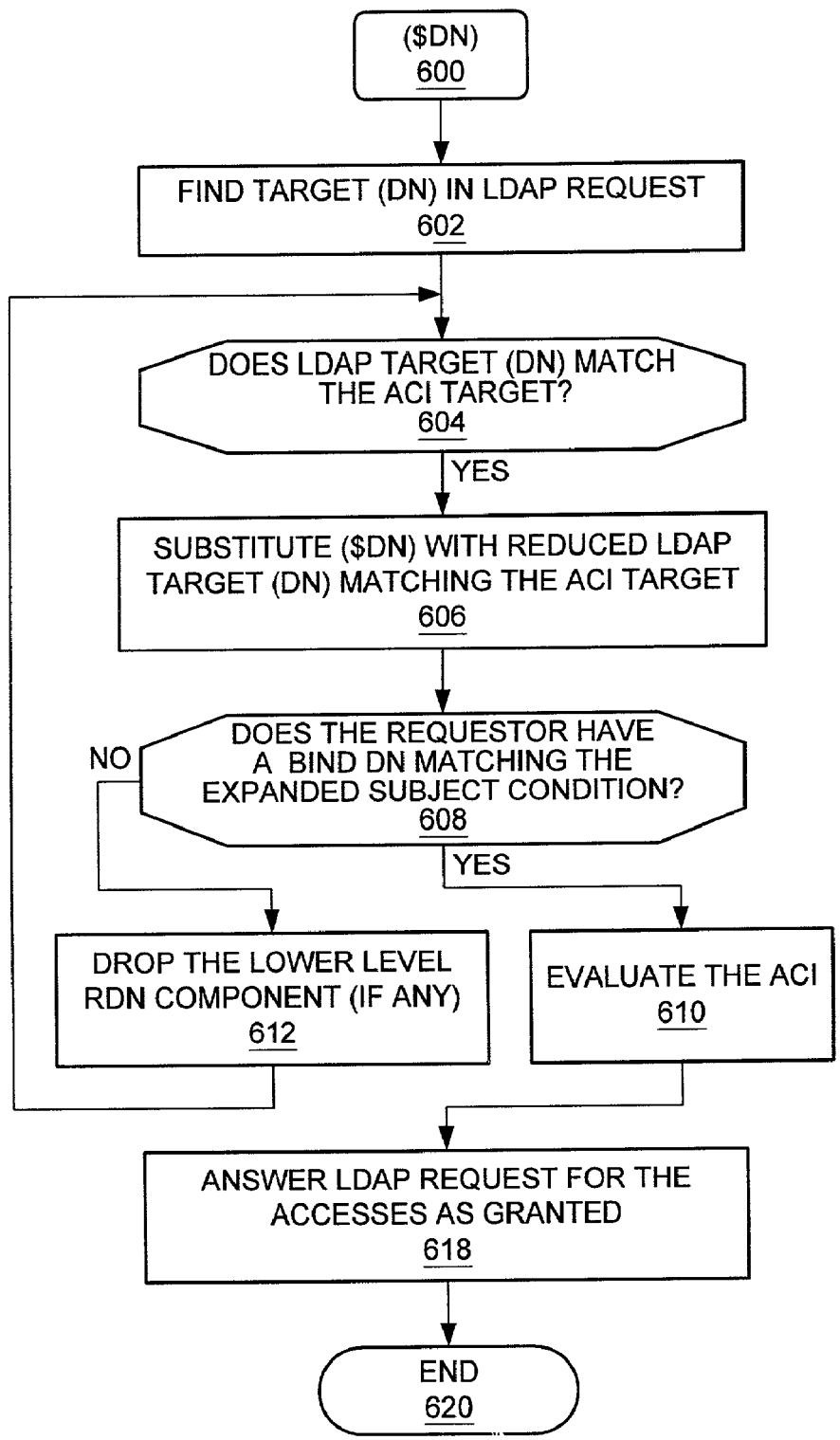
FIG. 11 is a flow-chart for a second form of macro in accordance with one embodiment.

Reference is now made to FIG. 11, in which operations 600, 602, 604 and 606 are similar to operations 500, 502, 504 and 506 of FIG. 10.

Consider for example an LDAP request targeted at the subtree shown in E.6.1, and the ACI shown at E.6.2. The steps for expanding this ACI are as follows. At 604, ($dn) in target matches dc=subdomain1, dc=hostedCompany1. At 606, [$dn] is replaced in subject with dc=subdomain1, dc=hostedCompany1. The result of this replacement is groupdn="ldap:///cn=DomainAdmins, ou=Groups, dc=subdomain1, dc=hostedCompany1, dc=siroe, dc=com".

E.6.1. cn=all, ou=groups, dc=subdomain1, dc=hostedCompany1, dc=siroe, dc=com

E.6.2. aci: (target="ldap:///ou=Groups, ($dn), dc=siroe, dc=com") (version 3.0; acl "Domain access"; allow (read,search) groupdn="ldap:///cn=DomainAdmins, ou=Groups, [$dn], dc=siroe, dc=com";)

At 608, if the bind DN is a member of that group, the matching process stops, and the ACI is evaluated, as shown at 610. If the bind DN is not a member of that group, the process continues. At 612, the left-most (lower level) RDN component is dropped from the group and 604 through 608 repeat with the new RDN. Thus, at 606, [$dn] in subject is replaced with dc=hostedcompany1. The result is groupdn="ldap:///cn=DomainAdmins, ou=Groups, dc=hostedCompany1, dc=siroe, dc=com".

If the bind DN is not a member of that group, the ACI is not evaluated at 610. If it is a member, the ACI is evaluated at 610. The LDAP request is answered at 618, if it is granted access (e.g., unless access is denied by the ACI).

In some embodiments, the [$dn] macro may provide a flexible way of granting access to domain-level administrators to all the subdomains in the directory tree. Therefore, it is useful for expressing a hierarchical relationship between domains. For example, the ACI of E.7.1 grants access to the members of E.7.2 (i.e. a group) to all of the subdomains under E.7.3, so an administrator belonging to that group could access, for example, the subtree E.7.4. However, at the same time, members of E.8.1, would be denied access to the E.8.2 and E.8.3 nodes.

E.7.1. aci: (target="ldap:///ou=*, ($dn), dc=siroe, dc=com") (targetattr="*")(targetfilter= (objectClass=nsManagedDomain)) (version 3.0; acl "Domain access"; allow (read,search) groupdn="ldap:///cn=DomainAdmins, ou=Groups, [$dn], dc=siroe, dc=com";)

E.7.2. cn=DomainAdmins, ou=Groups, dc=hostedCompany1, dc=siroe, dc=com

E.7.3. dc=hostedCompany1, dc=siroe, dc=com E.7.4. ou=people, dc=subdomain1.1, dc=subdomain1, dc=hostedCompany1, dc=siroe, dc=com E.8.1. cn=DomainAdmins, ou=Groups, dc=subdomain1.1, dc=subdomain1, dc=hostedCompany1, dc=siroe, dc=com E.8.2. ou=people, dc=hostedCompany1, dc=siroe, dc=com E.8.3. ou=groups, dc=hostedCompany1, dc=siroe, dc=com One embodiment of a method of performing macro matching for ($attr.<attrName>) will now be described with respect to FIG. 12. The exemplary ($attr.attrname) macro is normally used in the subject part of a DN.

Figure 12:
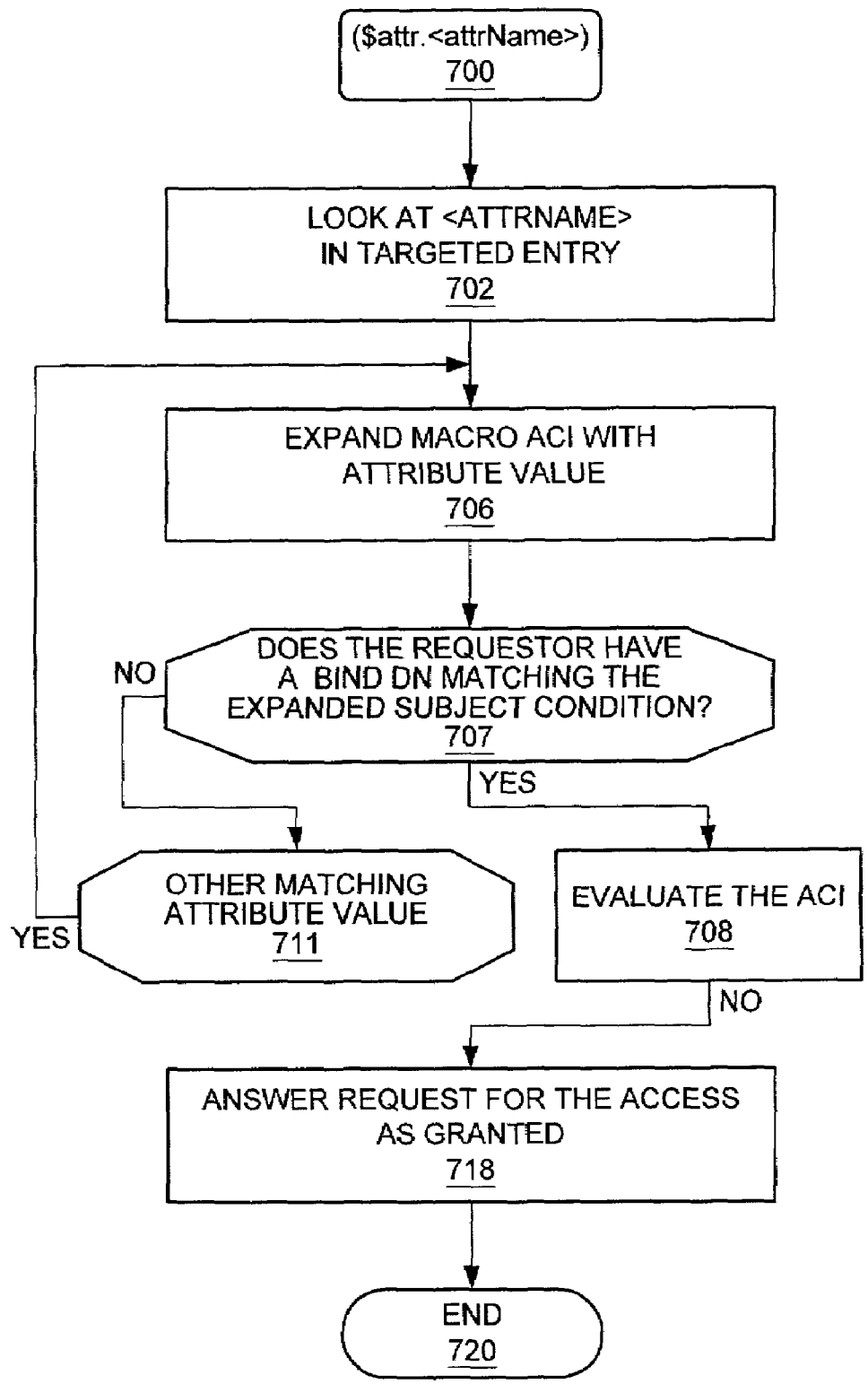
FIG. 12 is a flow-chart for a third form of macro in accordance with one embodiment.

In FIG. 12, operations 700, 702, 706 and 708 are similar to operations 500, 502, 506 and 508 of FIG. 10. For example, one may define the roledn of E.9.1. Now, assume the server receives an LDAP operation targeted at the following entry of E.9.2. In order to evaluate the roledn part of the ACI, the server looks at the ou attribute stored in the targeted entry (at 702), and uses the value of this attribute to expand the macro (at 706). Therefore, in the example, the roledn is expanded as shown in E.9.3. The Directory Server then evaluates the ACI according to the normal ACI evaluation algorithm, as shown at 708.

E.9.1. roledn="ldap:///cn=DomainAdmins, ($attr.ou)"

E.9.2. dn: cn=Heather Blue, ou=People, dc=HostedCompany1, dc=siroe, dc=com cn: Heather Bluesn: Blue ou: Engineering, dc=HostedCompany1, dc=siroe, dc=com . . .

E.9.3. roledn="ldap:///cn=DomainAdmnins, ou=Engineering, dc=HostedCompany1, dc=siroe, dc=com"

When an attribute is multi-valued (test 711), each value is used to expand the macro, and the first one that provides a successful match is used. Considering the exemplary request of E.10.1, in this case, when the Directory Server evaluates the ACI it performs a logical OR on the expanded expressions E.10.2 and E.10.3.

E.10.1. dn: cn=Heather Blue, ou=People, dc=HostedCompany1, dc=siroe, dc=com cn: Heather Bluesn: Blue ou: Engineering, dc=HostedCompany1, dc=siroe, dc=com ou: People, dc=HostedCompany1, dc=siroe, dc=com . . .

E.10.2. roledn="ldap:///cn=DomainAdmins, ou=Engineering, dc=HostedCompany1, dc=siroe, dc=com"

E.10.3. roledn="ldap:///cn=DomainAdmins, ou=People, dc=HostedCompany1, dc=siroe, dc=com"

The LDAP request is answered at 718, if it is granted access (i.e., unless access is denied by the ACI).

Generally, the macros may have an "input" portion, for defining the "input location," (i.e., where they take the information they use). In the directory example, the input information is target related, so a target location is needed, explicitly or implicitly, as a "reference portion" in the ACI.

Macros may also have an "output" portion that is related to the location(s) where they will apply. In the example, the output location is where the macro expression stands. This is a "variable portion" of the ACI (ACIs are examples of condition defining data). In the example, as shown in the table of FIG. 9, the target location is defined by the fact the ACI has a target definition that contains the ($dn) macro. A separate macro expression may be used for that purpose as well, to define the target, explicitly or implicitly.

Defining an input location may involve defining the type (or name) of the information (in the tree) that will serve as input. For example, a ($dn) macro aims at a distinguished name in the directory. Defining an input location may also involve defining an operation on that information. For example, the operation is comparing that information with the target portion of the ACI (or, more generally, with a reference portion in condition defining data).

The right column of the table also shows a second group of data in the condition defining data, i.e., the sections where the macro expression will simply be changed into its value, as calculated from the "reference portion" of the macro, e.g., the target definition that contains the ($dn) macro.

In the example, the second group of data comprises the following sections of the ACI: targetfilter, userdn, roledn, groupdn, userattr ("output section"). This output section comprises the subject section of the ACI, plus targetfilter, which is related to the target definition.

Thus, in the specific embodiment being described, a target that contains ($dn) should be defined in the ACI if ($dn) is also used in the subject section of the ACI, or in targetfilter, if [$dn] is used in the subject section of the ACI, or in targetfilter, and/or if ($attr.attrname) is used in the subject section of the ACI.

More generally, it will be appreciated that with ($dn), the "input location" for the macro is implicit (i.e., the target portion of the condition defining data). It may be explicitly defined as well (e.g., if it is desired to find input in other locations of the condition defining data). Similarly, with [$dn], the "input location" for the macro is also implicit, since it is the one defined by an accompanying ($dn) macro. Again, it may be explicitly defined as well, independently upon whether ($dn) is implicit or explicit. With ($attr.attrName), the "input location" for the macro is at least partially explicit, since it is the one defined by attrName. It may be implicit (e.g., by using several different macros associated to different attributes, especially if a small number of attributes is considered).

The above are three examples of using macros in combination with one or more access control mechanisms attached to one or more high level nodes in an LDAP tree instead of a large number of individual access control mechanisms for a large number of nodes at lower levels in the tree. The form and syntax of the above described macros is purely exemplary, and other forms and syntaxes may be used in other embodiments.

ACIs may be stored as attributes (or other properties) of entries (or nodes in a tree). Therefore, if an entry containing ACIs is part of a replicated database, the ACIs may be replicated like any other attribute.

Now turning to FIG. 13, a Directory server system may be based on a master directory server 800, accessing databases (e.g., 810 and 812) as required. Although the master server 800 may itself receive LDAP requests, these are often processed at the level of consumer servers, e.g., 850, which interact with main server 800, e.g., via appropriate network links 840 or through intermediate relaying computer systems.

In such a system, ACIs are preferably evaluated on the Directory Server that services the incoming LDAP requests. This means that when a consumer server 850 receives an update request, it will return a referral to the master server 800 before evaluating whether the request can be serviced or not on the master server 800.

The directory tree related functions may be viewed as implemented in a "tree structure processor", which is in fact a set of functions installed in a computer system. The novel functions of this invention may be implemented in such a tree structure processor, installed as 809 in main server 800, and/or at 859 in one or more consumer servers 850. In the field of directory servers, the tree structure processor is part of the directory server. Also, the corresponding set of functions may be made remotely available to computer stations, e.g., to consumer servers like 850.

In some embodiments, using macro condition defining data such as macro ACIs may allow the overall number of condition defining data to be reduced in some embodiments. Macro condition defining data may allow a considerable amount of simplification in the ACIs or other management oriented attributes attached to a directory server or to other similar tree structures. The benefit may be a factor of how many repeating patterns exist down and across the directory tree. It is observed that a directory tree may not necessarily include directory information as such. Other types of information may be targeted in a directory-like tree structure.

The above macros generally use a substitution based on the contents of targeted results in an LDAP request. The various modes of substitution which have been described are advantageous with LDAP trees in directory servers such as iPlanet directory servers. Other modes of substitution may be used to perform equivalent functions and/or to meet the particular needs of other types of directory servers. Others modes of substitution may also be used to meet the needs of other types of targeted information and/or for other purposes than access control.

Also, three main types of macros have been described. Only one or two of them may be used. More may be also used, if desired. Furthermore, macros may process condition defining data other than the above mentioned access control instructions.

A feature of ACIs is that they apply to subnodes in a tree structure. Other types of instructions having that property may be used in accordance with this invention. Alternatively, the ability to propagate to subnodes may be added to existing instructions, at least when using one or more of the types of macro expressions, as described.

As described in the example, the ($dn) macro just matches a simple substring of the target DN. Other matching schemes may be use instead, or in addition, e.g., a generic pattern matching a regular expression, which could then be re-used in the expression of the ACI subject.

Access Control Example

The following discussing describes an example of the tools that may be used for access control in one embodiment of a directory server, as available at the time the server is built. Note that this access control tool is merely exemplary and that alternative access control tools may be used in other embodiments.

Access Control Principles

The mechanism by which one defines access is called access control. When a server receives a request, it uses the authentication information provided by the user in the bind operation and the access control instructions (ACIs) defined in the server to allow or deny access to directory information. The server may be configured to allow or deny permissions such as read, write, search, and compare. The permission level granted to a user may be dependent on the authentication information provided.

Using access control, access to the entire directory, a subtree of the directory, specific entries in the directory (including entries defining configuration tasks), or a specific set of entry attributes may be controlled. Permissions may be set for a specific user, all users belonging to a specific group or role, or all users of the directory. Access may be defined for a specific location such as an IP address or a DNS name.

ACI Structure

Access control instructions may be stored in the directory as attributes of entries. The aci attribute may be an operational attribute. It may be available for use on every entry in the directory, regardless of whether it is defined for the object class of the entry. It may be used by the directory server to evaluate what rights are granted or denied when it receives an LDAP request from a client. The aci attribute may be returned in an ldapsearch operation if specifically requested.

The three main parts of an ACI statement are Target, Permission, and Bind Rule. In some embodiments, the permission and bind rule portions of the ACI are set as a pair and are called an Access Control Rule (ACR). The specified permission may be granted or denied depending on whether the accompanying rule is evaluated to be true.

ACI Placement

If an entry containing an ACI does not have any child entries, the ACI applies to that entry only. If the entry has child entries, the ACI applies to the entry itself and all entries below it. As a result, when the server evaluates access permissions to any given entry, it verifies the ACIs for every entry between the one requested and the directory suffix, as well as the ACIs on the entry itself.

The aci attribute is multi-valued, which means that you can define several ACIs for the same entry or subtree.

An ACI may be created so that it does not apply directly to the entry containing the ACI. Instead, the ACI may apply to some or all of the entries in the subtree below it. This may allow a general ACI that effectively applies to entries more likely to be located lower in the tree to be placed at a high level in the directory tree. For example, at the level of an organizationalUnit entry or a locality entry, one could create an ACI that targets entries that include the inetorgperson object class. Exceptions may exist. For example, ACIs placed in the root DSE entry may only apply to that entry.

This feature may allow the number of ACIs in the directory tree to be reduced by placing general rules at high level branch points. To limit the scope of more specific rules, they may be placed as close as possible to leaf entries.

ACI Evaluation

To evaluate the access rights to a particular entry, the server may compile a list of the ACIs present on the entry itself and on the parent entries back up to the top level entry stored on the directory server. In one embodiment, ACIs may be evaluated across all of the databases for a particular directory server, but not across directory servers.

The evaluation of this list of ACIs may be done based on the semantics of the ACIs, not on their placement in the directory tree. This means that ACIs that are close to the root of the directory tree may not take precedence over ACIs that are closer to the leaves of the directory tree.

The precedence rule that applies is as follows: ACIs that deny access take precedence over ACIs that allow access. Between ACIs that allow access, union semantics apply, so there is no precedence. For example, if an ACI denies write permission at the directory's root level, then none of the users can write to the directory regardless of the specific permissions you grant them. To grant a specific user write permissions to the directory, you have to restrict the scope of the original denial for write permission so that it does not include the user.

ACI Limitations

When creating an access control policy for a directory service, several restrictions may be considered. For example, in the case of a directory tree being distributed over several servers using the chaining feature, some restrictions may apply to the keywords which may be used in access control statements. Thus, ACIs that depend on group entries (groupdn keyword) may be required to be located on the same server as the group entry. If the group is dynamic, then all members of the group may be required to have an entry on the server too. If the group is static, however, the members's entries may be located on remote servers. ACIs that depend on role definitions (roledn keyword) may be required to be located on the same server as the role definition entry. Every entry that is intended to have the role may also be required to be located on the same server.

Values stored in the target entry may be value matched with values stored in the entry of the bind user (for example, using the userattr keyword). Access may be evaluated normally even if the bind user does not have an entry on server that holds the ACI.

Attributes generated by a CoS cannot be used in all ACI keywords in some embodiments. Specifically, one should not use attributes generated by CoS with the following keywords: targetfilter, targattrfilters, and userattr. If one creates target filters or bind rules that depend on the value of attributes generated by CoS, the access control rule may not work.

Access control rules may be evaluated on the local server. Therefore, it may not be necessary to specify the hostname or port number of the server in IDAP URLs used in ACI keywords. If one does, the LDAP URL may not be taken into account.

Default ACIs

In some embodiments, default ACIs may apply to some of the directory information. For example, in one embodiment, the following default ACIs mapply to the directory information stored in the userRoot database: users can modify their own entry in the directory, but not delete it or modify the aci and nsroledn attributes; users have anonymous access to the directory for search, compare, and read operations; the administrator (by default uid=admin, ou=Administrators, ou=TopologyManagement, o=NetscapeRoot) has all rights except proxy rights; all members of the Configuration Administrators group have all rights except proxy rights; all members of the Directory Administrators group have all rights except proxy rights; SIE group; and/or whenever a new database is created in the directory, the top entry may have the default ACIs listed above. As used in one embodiment, the NetscapeRoot subtree has its own set of default ACIs: all members of the Configuration Administrators group have all rights on the NetscapeRoot subtree except proxy rights; users have anonymous access to the NetscapeRoot subtree for search and read operations; group expansion; all authenticated users have search, compare, and read rights to configuration attributes that identify the administration server.

Default settings may be modified as needed to suit the needs of a given organization. For example, access control instructions may be created manually using LDIF ACI statements and added to a directory tree using the ldapmodify utility.

In embodiments using iDS as the directory, if access control is being set for a large number of directory entries, LDIF ACI statements may be used (as opposed to Console). Using LDIF ACI statements may take less time that using Console. Alternatively, to familiarize oneself with LDIF ACI statements, one may want to use the Directory Server Console to set the ACI and then click the Edit Manually button on the Access Control Editor. This shows the correct LDIF syntax. If the operating system allows it, one can even copy the LDIF from the Access Control Editor and paste it into a LDIF file.

ACI Syntax

The aci attribute may use the following syntax: aci: (target)(version 3.0;acl "name"; permission bind_rules;), where target specifies the entry, attributes, or set of entries and attributes for which you want to control access. The target can be a distinguished name, one or more attributes, or a single LDAP filter. The target may be an optional part of an ACI. Version 3.0 is a string that identifies the ACI version in this embodiment. "Name" is a name for the ACI. The name may be any string that identifies the ACI. The ACI name may be required in some embodiments. Permission specifically outlines what rights you are either allowing or denying (for example, read or search rights). Bind_rules specify the credentials and bind parameters that a user has to provide to be granted access. Bind rules may also specifically deny access to certain users or groups of users.

One may have multiple permission-bind rule pairs for each target. This may allow multiple access controls for a given target to be efficiently set. For example: target(permission bind_rule)(permission bind_rule). . . If one has several ACRs in one ACI statement, the syntax may be of the form: aci: (target)(version 3.0;acl "name";permission bind_rule; permission bind_rule; . . . permission bind_rule;).

Example ACI

The following is an example of a complete LDIF ACI: aci: (target="ldap:///uid=bjensen, dc=siroe, dc=com")(targetattr=*) (version 3.0; acl "aci"; allow (write) userdn="ldap:///self";). In this example, the ACI states that the user bjensen has rights to modify all attributes in his/her own directory entry.

The following sections describe the syntax of each portion of an ACI that may be used in one embodiment in more detail.

Defining Targets

The target identifies what the ACI applies to. If the target is not specified, the ACI may apply to the entry containing the aci attribute and to the entries below it. A target may be a directory entry or all of the entries in a subtree, attributes of an entry, a set of entries or attributes that match a specified LDAP filter, and/or an attribute value or combination of values that match a specified LDAP filter.

The general syntax for a target may be (keyword="expression") (keyword!="expression"), where keyword indicates the type of target, equal (=) indicates that the target is the object specified in the expression, and not equal (!=) indicates the target is not the object specified in the expression, and expression identifies the target.

The quotation marks (" ") around expression may be required in one embodiment. What you use for expression may be dependent upon the keyword that you supply. The following table lists exemplary keywords and associated expressions:

TABLE 6-1

LDIF Target Keywords

| Keyword | Valid Expressions | Wildcard Allowed? |
|---|---|---|
| target_ | ldap:///distinguished_name_ | yes_ |
| targetattr_ | attribute_ | yes_ |
| targetfilter_ | LDAP_filter_ | yes_ |
| targattrfilters_ | LDAP_operation:LDAP_filter_ | yes_ |

When placing an ACI on an entry, if it is not a leaf entry, the ACI also applies to all entries below it. For example, if one targets the entry ou=accounting, dc=siroe, dc=com, the permissions as set will apply to all entries in the accounting branch of the Siroe tree. As a counter example, when placing an ACI on the ou=accounting, dc=siroe, dc=com entry, one cannot target the uid=sarette, ou=people, dc=siroe, dc=com entry because it is not located under the accounting tree.

Targeting a Directory Entry

To target a directory entry (and the entries below it), one may use the target keyword. The target keyword may accept a value of the following format: target="ldap:///distinguished_name". This identifies the distinguished name of the entry to which the access control rule applies. For example: (target="ldap:///uid=bjensen, dc=siroe, dc=com"). If the DN of the entry to which the access control rule applies contains special characters such as commas, the special characters may be escaped with a single backslash (\). For example: (target="ldap:///uid=1fuentes, dc=Siroe Bolivia\, S.A.").

One may also use a wildcard when targeting a distinguished name using the target keyword. The wildcard indicates that any character or string or substring is a match for the wildcard. Pattern matching may be based on any other strings that have been specified with the wildcard. The following are legal examples of wildcard usage: (target="ldap:///uid=*, dc=siroe, dc=com") (matches every entry in the entire Siroe tree that has the uid attribute in the entry's RDN); (target="ldap:///uid=*Anderson, dc=siroe, dc=com") (matches every entry directly under the Siroe node with a uid ending in Anderson); and (target="ldap:///uid=C*A, dc=siroe, dc=com") (matches every entry directly under the Siroe node with a uid beginning with C and ending with A).

Depending on the position of the wildcard, it may apply to the full DN, not only to attribute values. Therefore, the wildcard may be used as a substitute for portions of the DN. For example, uid=andy*, dc::siroe, dc=com targets all the directory entries in the entire Siroe tree with a matching uid attribute, and not just the entries that are immediately below the dc=siroe, dc=com node. In other words, this target matches with longer expressions such as uid=andy, ou=eng, dc=siroe, dc=com, or uid=andy, ou=miarketing, dc=siroe, dc=com. Some other valid examples follow: (target="ldap:///uid=*, dc=siroe, dc=com") (matches every entry in the entire Siroe tree that has the uid attribute in the entry's RDN); (target="ldap:///uid=*, ou=*, dc=siroe, dc=com") (matches every entry in the Siroe tree whose distinguished name contains the uid and ou attributes). Thus, uid=fchen, ou=Engineering, dc=siroe, dc=com or uid=claire, ou=Engineering, ou=people, dc=siroe, dc=com would match, but the following would not: uid=bjensen, dc=siroe, dc=comou=Engineering, dc=siroe, dc=com.

As they may be cited in this specification, Sun, Sun Microsystems, Solaris, Java, EmbeddedJava, PersonalJava, JavaBeans, Java Naming and Directory Interface, JDBC, Enterprise JavaBeans (EJB), Jini, Sun Spontaneous Management, Java 2 Enterprise Edition (J2EE), JavaServer Pages (JSP) and I-planet are trademarks of Sun Microsystems, Inc. SPARC is a trademark of SPARC International, Inc.

Numerous variations and modifications will become apparent to those skilled in the art once the above disclosure is fully appreciated. It is intended that the following claims be interpreted to embrace all such variations and modifications.

What is claimed is:

1. A method of implementing uode related conditions in a directory server having a tree structure using condition-defining data attached to nodes, the method comprising:
  attaching condition-defining data to a given node in the tree structure, said condition defining data having a variable portion and a reference portion, wherein said condition-defining data comprises access control information;
  attaching a macro to the given node or to a higher level node;
  upon access to a subnode of said given node in the tree:
    generating an expanding version of the access control information using the macro, wherein the expanded version comprises additional information derived from one or more attributes stored at the directory server;
    evaluating the expanding version of the access control information; and
    controlling access to the subuode from the result of said evaluating.

2. A computer-implemented method, comprising:
  storing access control information for a particular node of a tree of nodes representing entities managed by a directory server, wherein the access control information comprises at least one macro entry;
  in response to a request from a requester for a directory server operation targeted at a node of the tree,
    generating an expanded version of the access control information using the at least one macro entry, wherein the expanded version comprises additional information derived from one or more attributes stored at the directory server;
  determining whether the requester has permission for the directory server operation, wherein said determining comprises comparing at least a portion of the expanded version of the access control information with one or more attribute values of the requester;
    in response to determining that the requester has permission, performing the directory server operation; and
    in response to determining that the requester does not have permission, providing a failure indication to the requester.

3. The method as recited in claim 2, wherein the expanded version is derived at least in part by replacing the at least one macro entry with at least one substitute string derived from the one or more attributes stored at the directory server.

4. The method as recited in claim 2, wherein the request is targeted at the particular node, and wherein the additional information is derived from one or more attributes of the particular node.

5. The method as recited in claim 2, wherein the particular node is a root node of a subtree of other nodes of the tree, wherein the request is targeted at an other node of the subtree, and wherein the additional information is derived from one or more attributes of the other node.

6. The method as recited in claim 2, wherein said determining whether the requester has permission for the directory server operation comprises determining whether an attribute value of the requester matches an attribute value specified in the expanded version of the access control information.

7. The method as recited in claim 5, wherein said generating the expanded version comprises adding a plurality of fields to the access control information, wherein said determining whether the requester has permission for the directory server operation comprises:
  in response to determining that the attribute value of the requester does not match the expanded version, modifying the expanded version by removing at least one field of the plurality of fields from the expanded version; and
  determining whether an attribute value of the requester matches an attribute value specified in the modified expanded version of the access control information.

8. The method as recited in claim 2, wherein the access control information comprises two or more macro entries, including a target macto entry in a portion of the access control information identifying a target object to which access is to be controlled, and a subject macro entry in a portion of the access control information specifying attributes of requesters to whom access is to be provided.

9. The method as recited in claim 8, wherein said generating the expanded version comprises replacing the target macro entry with a first substitute string, and replacing the subject macro entry with a second substitute string derived from the first substitute string.

10. The method as recited in claim 2, wherein the at least one macro entity identifies an attribute name, wherein the additional information comprises at least one string derived from a value of an attribute identified by the attribute name.

11. The method as recited in claim 10, wherein the attribute identified by the attribute name is a multi-valued attribute, wherein the directory server stores at least a first value and a second value for the multi-valued attribute for the node targeted by the request, wherein the additional information comprises the first value of the multi-valued attribute, wherein said determining whether the requester has permission comprises:
 comparing a portion of the expanded version including the first value with the requester's value of the multi-valued attribute;
 in response to determining that the portion of the expanded version does not match the requester's value, generating a second expanded version of the access control information by replacing the first value of the multi-valued attribute in the expanded version with the second value of the multi-valued attribute; and
 comparing a portion of the second expanded version including the second value with the requester's value of the multi-valued attribute.

12. The method as recited in claim 2, wherein the additional information is derived from a distinguished name of a node of the tree.

13. The method as recited in claim 2, wherein the at least one macro entry is included within a portion of the access control information that identifies a distinguished name of a group of entities defined at the directory server.

14. The method as recited in claim 2, wherein the at least one macro entity is included within a portion of the access control information that identifies a distinguished name of a role defined at the directory server.

15. The method as recited in claim 2, wherein the at least one macro entity is included within a portion of the access control information that identifies at least one of: a distinguished name of a user identified at the directory server, and a user attribute defined at the directory server.

16. The method as recited in claim 2, wherein the at least one macro entity is included within a portion of the access control information that specifies a target filter used by the directory server to select nodes to which the access control information applies.

17. A system, comprising:
 a processor;
 a memory coupled to the processor, wherein the memory stores program instructions executable by the processor to:
  store access control information for a particular node of a tree of nodes representing entities managed by a directory server, wherein the access control information comprises at least one macro entry;
  in response to a request from a requester for a directory sever operation targeted at anode of the tree,
   generate an expanded version of the access control information using the macro entry, wherein the expanded version includes additional information derived from one or more attributes stored at the directory server;
  determining whether the requester has permission for the directory sewer operation, wherein said determining comprises comparing at least a portion of the expanded version of the access control information with one or more attribute values of the requester;
  in response to determining that the requester has permission, perform the directory server operation; and
  in response to determining that the requester does not have permission, provide a failure indication to the requester.

18. The system as recited in claim 17, wherein the expanded version is derived at least in part by replacing the at least one macro entry with at least one substitute string derived from the one or more attributes stored at the directory server.

19. The system as recited in claim 18, wherein the request is targeted at the particular node, and wherein the additional information is derived from one or more attributes of the particular node.

20. The system as recited in claim 17, wherein the particular node is a root node of a subtree of other nodes of the tree, wherein the request is targeted at an other node of the subtree, and wherein the additional information is derived from one or more attributes of the other node.

21. The system as recited in claim 17, wherein said determining whether the requester has permission for the directory server operation comprises determining whether an attribute value of the requester matches an attribute value specified in the expanded version of the access control information.

22. The system as recited in claim 21, wherein the additional information comprises a plurality of fields, wherein said determining whether the requester has permission for the directory server operation comprises:
 in response to determining that the attribute value of the requester does not match the expanded version, modifying the expanded version by removing at least one field of the plurality of fields from the expanded version; and
 determining whether an attribute value of the requester matches an attribute value specified in the modified expanded version of the access control information.

23. The system as recited in claim 17, wherein the access control information comprises two or more macro entries, including a target macro entry in a portion of the access control information identifying a target object to which access is to be controlled, and a subject macro entry in a portion of the access control information specifying attributes of requesters to whom access is to be provided.

24. The system as recited in claim 23, wherein said generating the expanded version comprises replacing the target macro entry with a first substitute string, and replacing the subject macro entry with a second substitute string derived from the first substitute string.

25. The system as recited in claim 17, wherein the at least one macro entity identifies an attribute name, wherein the additional information is derived from a value of an attribute identified by the attribute name.

26. The system as recited in claim 25, wherein the attribute identified by the attribute name is a multi-valued attribute, wherein the directory server stores at least a first value and a second value for the multi-valued attribute for the node targeted by the request, wherein the additional information comprises the first value of the multi-valued attribute, wherein said determining whether the requester has permission comprises:

comparing a portion of the expanded version including the first value with the requester's value of the multi-valued attribute;

in response to determining that the portion of the expanded version does not match the requester's value, generating a second expanded version of the access control information by replacing the first value of the multi-valued attribute in the expanded version with the second value of the multi-valued attribute; and comparing a portion of the second expanded version including the second value with the requester's value of the multi-valued attribute.

27. The system as recited in claim 17, wherein the additional information is derived from a distinguished name of a node of the tree.

28. The system as recited in claim 17, wherein the at least one macro entry is included within a portion of the access control information that identifies a distinguished name of a group of entities defined at the directory server.

29. The system as recited in claim 17, wherein the at least one macro entry is included within a portion of the access control information that identifies a distinguished name of a role defined at the directory server.

30. The system as recited in claim 17, wherein the at least one macro entry is included within a portion of the access control information that identifies at least one of: a distinguished name of a user identified at the directory server, and a user attribute defined at the directory server.

31. The system as recited in claim 17, wherein the at least one macro entry is included within a portion of the access control information that specifies a target filter used by the directory server to select nodes to which the access control information applies.

32. A tangible, computer-readable storage medium, comprising program instructions, wherein the instructions are computer-executable to:

store access control information for a particular node of a tree of nodes representing entities managed by a directory server, wherein the access control information comprises at least one macro entry;

in response to a request from a requester for a directory server operation targeted at a node of the tree, generate an expanded version of the access control information using the at least one macro entry, wherein the expanded version includes additional information derived from one or more attributes stored at the directory server;

determining whether the requester has permission for the directory server operation, wherein said determining comprises comparing at least a portion of the expanded version of the access control information with one or more attribute values of the requester;

in response to determining that the requester has permission, perform the directory server operation; and in response to determining that the requester does not have permission, provide a failure indication to the requester.

33. The computer-readable storage medium as recited in claim 32, wherein the expanded version is derived at least in part by replacing the at least one macro entry with at least one substitute string derived from the one or more attributes stored at the directory server.

34. The computer-readable storage medium as recited in claim 32, wherein the request is targeted at the particular node, and wherein the additional information is derived from one or more attributes of the particular node.

35. The computer-readable storage medium as recited in claim 32, wherein the particular node is a-root node of a subtree of other nodes of the tree, wherein the request is targeted at an other node of the subtree, and wherein the additional information is derived from one or more attributes of the other node.

36. The computer-readable storage medium as recited in claim 32, wherein said determining whether the requester has permission for the directory server operation comprises determining whether an attribute value of the requester matches an attribute value specified in the expanded version of the access control information.

37. The computer-readable storage medium as recited in claim 36, wherein the at additional information comprises a plurality of fields, wherein said determining whether the requester has permission for the directory server operation comprises:

in response to determining that the attribute value of the requester does not match the expanded version, modifying the expanded version by removing at least one field of the plurality of fields from the expanded version; and determining whether an attribute value of the requester matches an attribute value specified in the modified expanded version of the access control information.

38. The computer-readable storage medium as recited in claim 32, wherein the access control information comprises two or more macro entries, including a target macro entry in a portion of the access control information identifying a target object to which access is to be controlled and a subject macro entry in a portion of the access control information specifying attributes of requesters to whom access is to be provided.

39. The computer-readable storage medium as recited in claim 38, wherein said generating the expanded version comprises replacing the target macro entry with a first substitute string, and replacing the subject macro entry with a second substitute string derived from the first substitute string.

40. The computer-readable storage medium as recited in claim 32, wherein the at least one macro entity identifies an attribute name, wherein the additional information is derived from a value of an attribute identified by the attribute name.

41. The computer-readable storage medium as recited in claim 40, wherein the attribute identified by the attribute name is a multi-valued attribute, wherein the directory server stores at least a first value and a second value for the multi-valued attribute for the node targeted by the request, wherein the additional information comprises the first value of the multi-valued attribute, wherein said determining whether the requester has permission comprises:

comparing a portion of the expanded version including the first value with the requester's value of the multi-valued attribute;

in response to determining that the portion of the expanded version does not match the requester's value, generating a second expanded version of the access control information by replacing the first value of the multi-valued attribute in the expanded version with the second value of the multi-valued attribute; and comparing a portion of the second expanded version including the second value with the requester's value of the multi-valued attribute.

42. The computer-readable storage medium as recited fn claim 32, wherein the additional information is derived from a distinguished name of a node of the tree.

43. The computer-readable storage medium as recited in claim 32, wherein the at least one macro entry is included within a portion of the access control information that identifies a distinguished name of a group of entities defined at he directory server.

44. The computer-readable storage medium as recited in claim 32, wherein the at least one macro entity is included within a portion of the access control information that identifies a distinguished name of a role defined at the directory server.

45. The computer-readable storage medium as recited in claim 32, wherein the at least one macro entity is included within a portion of the access control information that identifies at least one of: a distinguished name of a user identified at the directory server, a user attribute defined at the directory server, and a target filter used by the directory server to select nodes to which access control information applies.

* * * * *

UNITED STATES PATENT AND TRADEMARK OFFICE
CERTIFICATE OF CORRECTION

PATENT NO. : 7,167,918 B2
APPLICATION NO. : 10/045682
DATED : January 23, 2007
INVENTOR(S) : Robert Byrne and Prasanta Behera It is certified that error appears in the above-identified patent and that said Letters Patent is hereby corrected as shown below:

On the Title Page:
Item [75]
Delete inventor "Pransanta Behara" and insert --Prasanta Behera-- in place thereof.

Claim 8, col. 18, line 65, please delete "macto" and insert --macro--in place thereof.

Claim 17, col. 20, line 5, please delete "sewer" and insert--server--in place thereof.

Signed and Sealed this

Tenth Day of April, 2007

JON W. DUDAS
*Director of the United States Patent and Trademark Office*